(12) United States Patent
Zeitzheim

(10) Patent No.: US 11,156,227 B2
(45) Date of Patent: Oct. 26, 2021

(54) MAGNETIC ROTATION COMPONENT

(71) Applicant: Max Baermann GmbH, Bergisch Gladbach (DE)

(72) Inventor: Martin Zeitzheim, Baumbach (DE)

(73) Assignee: Max Baermann GmbH, Bergisch Gladbach (DE)

(*) Notice: Subject to any disclaimer, the term of this patent is extended or adjusted under 35 U.S.C. 154(b) by 111 days.

(21) Appl. No.: 16/307,130

(22) PCT Filed: Jun. 6, 2017

(86) PCT No.: PCT/EP2017/000650
§ 371 (c)(1),
(2) Date: Dec. 4, 2018

(87) PCT Pub. No.: WO2017/211449
PCT Pub. Date: Dec. 14, 2017

(65) Prior Publication Data
US 2019/0170150 A1    Jun. 6, 2019

(30) Foreign Application Priority Data

Jun. 6, 2016  (DE) .................. 20 2016 102 995.3

(51) Int. Cl.
*F04D 29/04*       (2006.01)
*F04D 29/044*    (2006.01)
(Continued)

(52) U.S. Cl.
CPC .......... *F04D 29/044* (2013.01); *F04D 13/06* (2013.01); *F04D 29/046* (2013.01); *F16D 1/072* (2013.01); *H02K 1/28* (2013.01); *H02K 7/003* (2013.01)

(58) Field of Classification Search
CPC .... F04D 29/044; F04D 29/042; F04D 29/046; H02K 1/28; H02K 7/003; F16D 1/072
See application file for complete search history.

(56) References Cited

U.S. PATENT DOCUMENTS 3,411,027 A    11/1968  Rosenberg
4,652,169 A     3/1987  Matthews
(Continued)

FOREIGN PATENT DOCUMENTS

CH       346 518 A     5/1960
CN    102761192 A    10/2012
(Continued)

OTHER PUBLICATIONS

The International Bureau of WIPO, PCT Application No. PCT/EP2017/000650, International Preliminary Report on Patentability (English translation), dated Dec. 11, 2018.
Korean Intellectual Property Office, Notice of Preliminary Rejection for Application No. 10-2018-7035074, dated Mar. 5, 2020, pp. 1-4.
European Patent Office, English abstract for KR20140074835 A, printed on Apr. 7, 2020.
(Continued)

*Primary Examiner* — Michael L Sehn
(74) *Attorney, Agent, or Firm* — Cahn & Samuels, LLP

(57) ABSTRACT

The invention relates to a magnetic rotation component (1) comprising a magnet component (4) that includes a permanent magnet, and a rotation component (5) that has an axis of rotation (r). In order to design the magnetic rotation component (1) in such a way that same has a simple structure and can be mounted easily and cost-effectively, the magnet component (4) and the rotation component (5) are arranged so as to be fixedly connected to each other by means of a flange (6). The magnetic rotation component (1) can be designed as an impeller (2).

19 Claims, 7 Drawing Sheets

A-A

Figure 5:
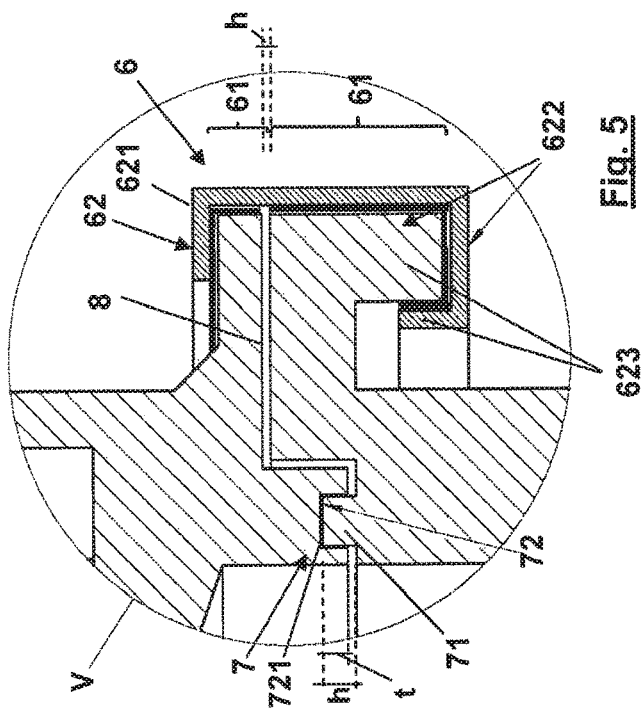

(51) Int. Cl.
    *F16D 1/072*     (2006.01)
    *H02K 1/28*     (2006.01)
    *H02K 7/00*     (2006.01)
    *F04D 13/06*     (2006.01)
    *F04D 29/046*     (2006.01)

(56) References Cited

U.S. PATENT DOCUMENTS

| | | | |
|---|---|---|---|
| 6,259,343 | B1 | 7/2001 | Schwarz |
| 6,680,000 | B2 | 1/2004 | Sasazawa et al. |
| 8,137,079 | B2 | 3/2012 | Yamazaki et al. |
| 8,653,707 | B2 | 2/2014 | Furukawa et al. |
| 8,708,672 | B2 * | 4/2014 | Marks ............. A61H 33/60 |
| | | | 417/420 |
| 9,172,282 | B2 | 10/2015 | Suzuki et al. |
| 2003/0222527 | A1 | 12/2003 | Laing et al. |
| 2014/0028119 | A1 * | 1/2014 | Sagalovskiiy ......... H02K 5/132 |
| | | | 310/43 |

FOREIGN PATENT DOCUMENTS

| | | |
|---|---|---|
| DE | 86 03 952 U1 | 4/1986 |
| DE | 87 05 698 U1 | 6/1987 |
| DE | 86 03 982 U1 | 7/1987 |
| DE | 4 205 248 A1 | 8/1993 |
| DE | 298 15 163 U1 | 1/1999 |
| DE | 198 36 451 C2 | 5/2000 |
| DE | 10 2004 034 176 A1 | 2/2006 |
| DE | 10 2008 015 219 A1 | 10/2008 |
| DE | 10 2008 004588 A1 | 1/2009 |
| DE | 10 2007 050 258 A1 | 4/2009 |
| DE | 10 2011 079 225 A1 | 1/2013 |
| DE | 10 2015 210 705 A1 | 12/2016 |
| JP | 2003041116 A | 2/2003 |
| JP | 2004173497 A | 6/2004 |
| JP | 2008240526 A | 10/2008 |
| JP | 2011188701 A | 9/2011 |
| JP | 2012044755 A | 3/2012 |
| JP | 5143165 B2 | 2/2013 |
| KR | 20140074835 A | 6/2014 |

OTHER PUBLICATIONS

European Patent Office, PCT Application No. PCT/EP2017/000650, International Search Report, dated Sep. 28, 2017.
European Patent Office, English abstract of DE 10 2008 004588, printed Oct. 29, 2018.
European Patent Office, English abstract of DE 42 05 248, printed Oct. 29, 2018.
European Patent Office, English abstract of DE 198 36 451 A1, printed Dec. 4, 2018.
European Patent Office, English abstract of DE 10 2007 050 258 A1, printed Dec. 4, 2018.
Japanese Patent Office, Notification of Reasons for Rejection in Pat. App No. 2019-516055, dated Feb. 4, 2020, pp. 1-5.
European Patent Office, English abstract of DE 10 2004 034 176 A1, printed on Feb. 21, 2020, p. 1.
European Patent Office, English abstract of JP2004173497A, printed on Feb. 21, 2020, p. 1.
European Patent Office, English abstract of JP2008240526A, printed on Feb. 21, 2020, p. 1.
European Patent Office, English abstract of JP2011188701A, printed on Feb. 21, 2020, p. 1.
European Patent Office, English abstract of JP2012044755A, printed on Feb. 21, 2020, p. 1.
European Patent Office, English Abstract of JP2012044755 A, printed on Jul. 7, 2020.
European Patent Office, English Abstract of JP5143165 B2, printed on Jul. 7, 2020.
China National Intellectual Property Administration, office action including search report for Chinese Application No. 201780035089.7, Mar. 26, 2020, pp. 1-10.
China National Intellectual Property Administration, English translation of search report for Chinese Application No. 2017800350891, dated Mar. 26, 2020, pp. 1-2.
European Patent Office, English Abstract of DE10 2015 210 705 A1, printed on Nov. 10, 2020.
European Patent Office, English Abstract of DE10 2011 079 225 A1, printed on Nov. 10, 2020.
European Patent Office, Examination Report for App. No. 17 734 234.2, dated Sep. 25, 2020, pp. 1-5.

* cited by examiner

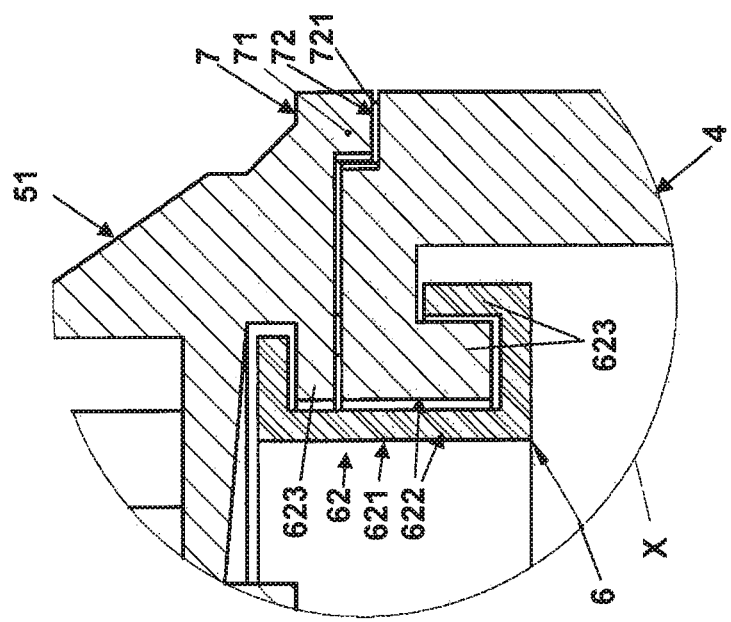
Fig. 10
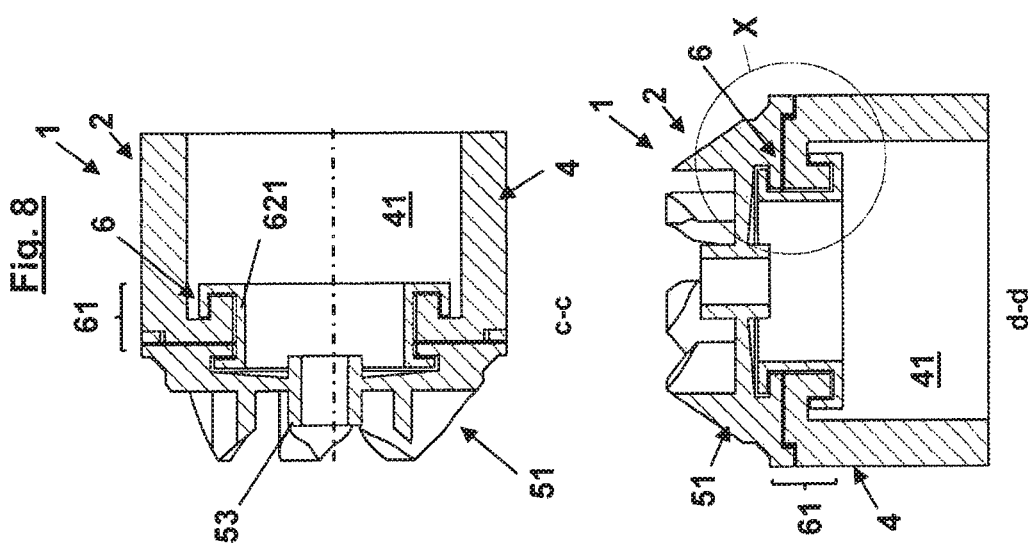
Fig. 8
Fig. 9
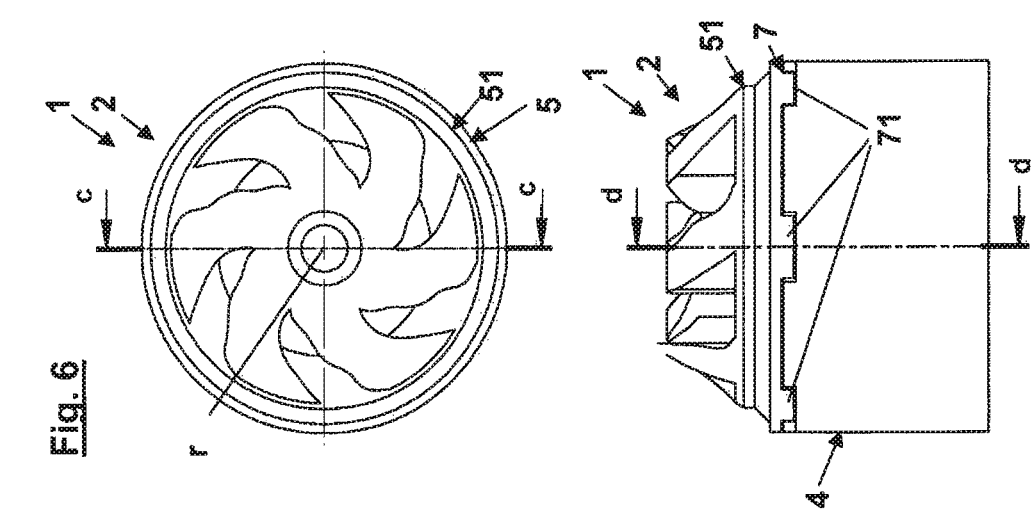
Fig. 6
Fig. 7

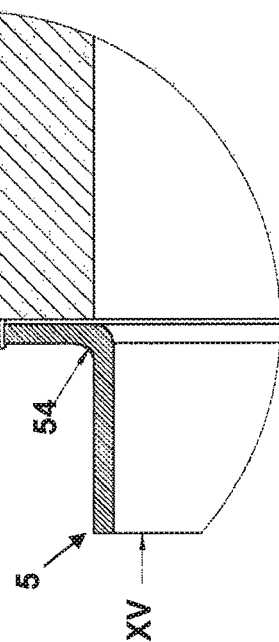
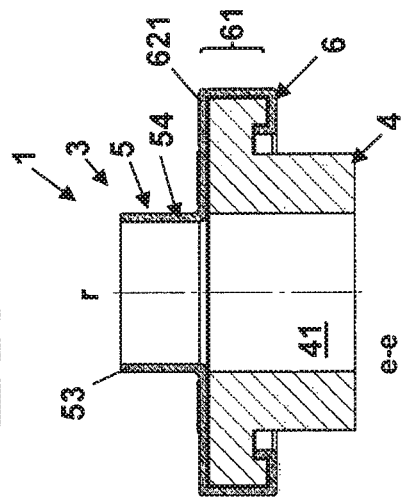
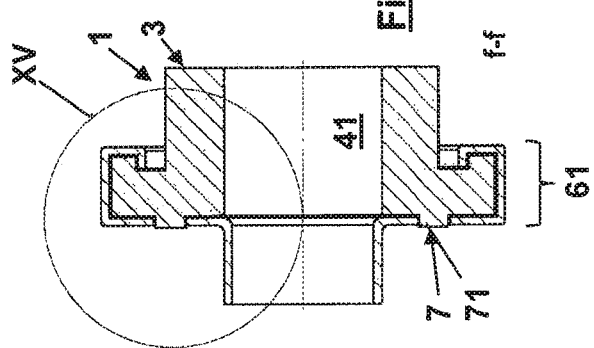
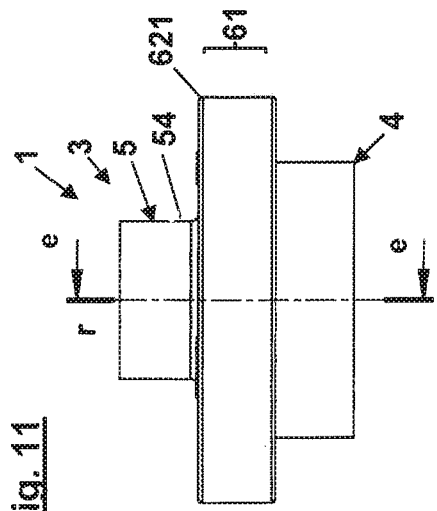
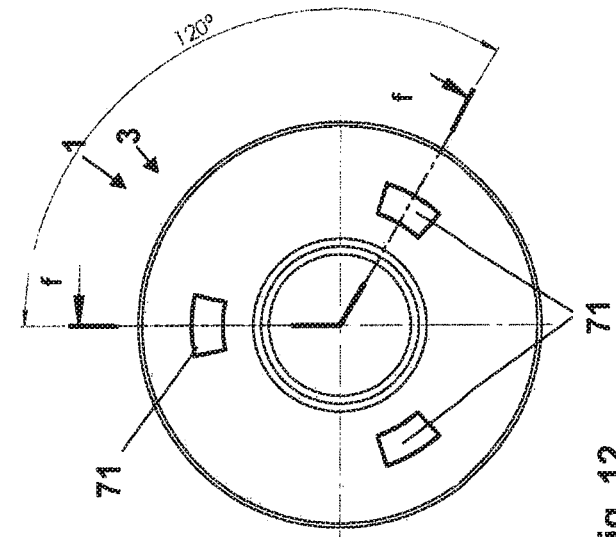

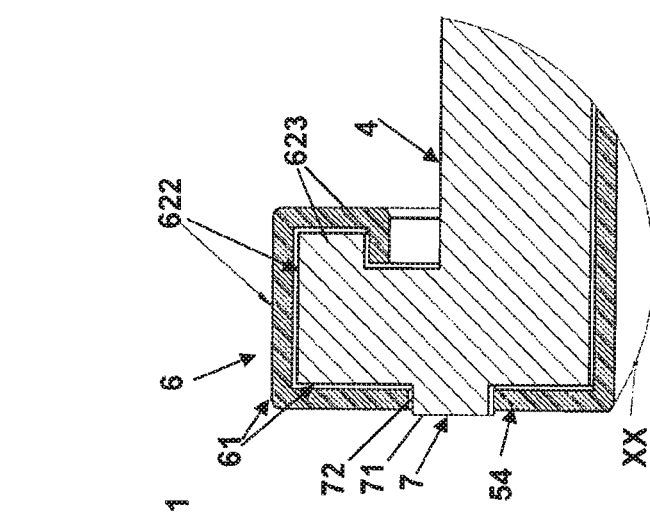
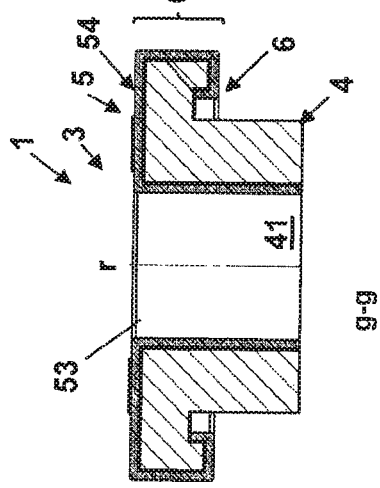
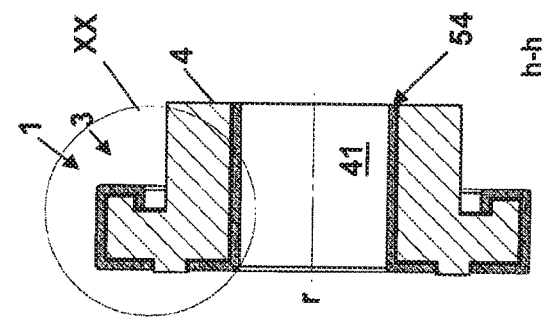
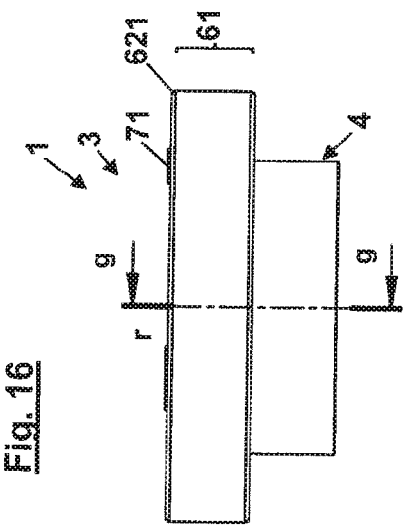
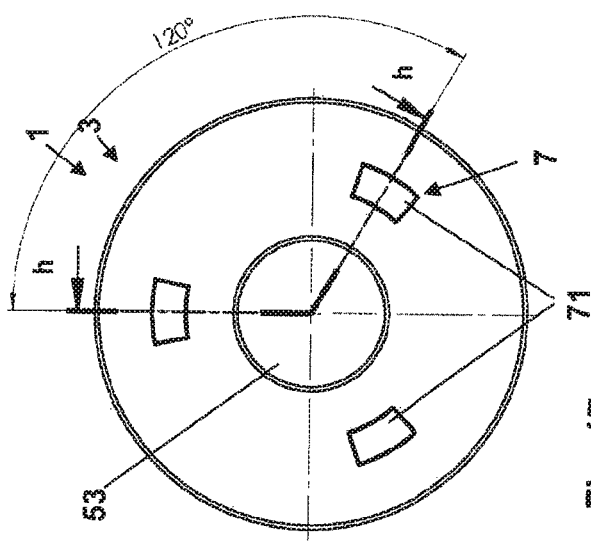

MAGNETIC ROTATION COMPONENT

This application is the National Stage of International Application No. PCT/EP2017/000650, filed on Jun. 6, 2017, which claimed the benefit of German Application No. DE 20 2016 102 995.3 filed Jun. 6, 2016, which are hereby both incorporated by reference.

I. FIELD OF THE INVENTION

The invention relates to a magnetic rotation component, comprising a magnet component with a permanent magnet and a rotation component with an axis of rotation.

II. BACKGROUND OF THE INVENTION

A magnetic rotation component of this type, which is designed as an impeller, is disclosed for example in DE 298 15 163 U1, wherein the magnet component and rotation component are connected together in an expensive manner by means of a common central axial pin.

A magnetic rotation component for electric machines, with a substantially cylindrical magnet support and at least one permanent magnet, is known from DE 10 2004 034 176 A1, in which the magnet support and the permanent magnet are arranged on a shaft, and with a fixing ring which is applied to the shaft on one end face of the rotor arrangement and is engaged with the magnet support and/or the permanent magnet in order to secure the permanent magnet against twisting.

III. SUMMARY OF THE INVENTION

An object of the invention is to provide a magnetic rotation component which is of simple construction and can be assembled simply and inexpensively.

The object set is achieved according to at least one embodiment of the invention. The object set is achieved already in that the magnet component and the rotation component are arranged connected securely together by means of flange.

By means of the flange, the connection between the two components, the magnet component and the rotation component, can be produced surprisingly simply and inexpensively. The flange may in this case take place in a simple manner by machine. The components are arranged in a connection position, connected together by means of flange.

In particular, the two components may form a structural unit. Preferably, the two components and in particular the structural unit may have a cylinder geometry with the axis of rotation as the cylinder axis. Both components, possibly except for small structural deviations, may have a form which is rotationally symmetrical to the axis of rotation.

The axis of rotation also includes the possibility of the rotary shaft, the magnetic rotation component in the case of the rotary shaft being arranged non-rotatably thereon, and in the case of the axis of rotation being arranged rotatably thereon.

In particular, the magnetic rotation component may be arranged so as to be rotationally movable in relation to a structural environment with respect to the axis of rotation.

This includes in particular the magnetic rotation component and/or the structural environment possibly being arranged so as to be rotationally movable with respect to a base of a device with the magnetic rotation component and the structural environment. That is to say in particular that, in each case with respect to the base, the structural environment may be arranged in fixed manner and the magnetic rotation component non-rotatably by means of the axis of rotation, or the magnetic rotation component may be arranged in fixed manner and the structural environment so as to be rotationally movable by means of the axis of rotation. Alternatively, the structural environment and the magnetic rotation component may also be arranged movably with respect to the base, in particular so as to be rotationally movable to the axis of rotation, with relative rotational movability between the structural environment and magnetic rotation component being provided at the same time with respect to the axis of rotation.

In particular, the magnetic rotation component may be arranged embedded in particular so as to be rotationally movable in the structural environment. In particular, the structural environment may be a bearing arrangement of the axis of rotation of the magnetic rotation component.

The magnetic rotation component may be in a connection, in particular in an operative connection, with the structural environment.

In particular, this operative connection may take place by means of the magnetic field of the magnet part. In particular, the structural environment may be characterized in that the magnetic rotation component due to its function acts on the structural environment in particular by means of the magnetic field of its magnet part.

This may for example be done in that the magnetic rotation component is used as a stator or rotor for an electric drive. Further, for example, in that the structural environment comprises a sensor which is arranged so as to be rotationally movable relative to the magnetic rotation component with respect to the axis of rotation.

The magnetic rotation component may have a hollow shaft or sleeve, by means of which it is mounted rotatably on the axis of rotation or in twisting-resistant manner on the rotary shaft. Preferably the hollow shaft or sleeve is part of one of the two components.

Both components may be connected together non-rotatably by means of the flange.

At least an axially displacement-resistant and in particular twisting-resistant connection can be obtained by means of the flange. The flange can take place by means of a preferably elastic-plastic deformation in particular by compression and/or by extension.

In particular, provision may be made for the magnet component and the rotation component in each case to have a flanged region, which regions overlap to form the flange. Advantageously in simple manner, the flanged region may be formed in a ring shape. The flanged region may be produced over part or the whole of the periphery. In particular, the flanged region may be segment-like, in particular circular-ring-segment-like, or alternatively be in the form of a circular ring or polygonal ring. This is advantageous in the case of rotational symmetries or axis-of-rotation symmetries of the components.

The magnet component and/or rotation component may have a plurality of flanged regions. Flanged regions of the magnet component and rotation component which are associated with each other may overlap. In particular, the flanged regions may beneficially be arranged peripherally spaced apart from each other with regard to connection fatigue strength.

Preferably the connection between the two components, that is to say of the magnet component and rotation component, takes place solely by means of the flange. The flange may take place in that the flanged region of one of the components crimps that of the other component, or in that the flanged regions of the two components crimp by interlocking.

In particular, provision may be made for the associated flanged regions to be arranged interlocking in hook-like manner for their connection by flange.

Dependent on the bending strength of the materials used, the flanged regions may for example be connected together, forming a Pittsburgh seam with standing seam, to form a secure connection which can be broken only by at least partial destruction.

Limits may be set with regard to possible deformation of the flanged regions, in particular in the case of brittle materials, as are frequently encountered in magnets.

Thus the flanged regions may be connected together by means of a snap lock seam with catch standing seam to form a locking insertion connection. The latter has the advantage that the insertion connection with insertion of the catch standing seam in the snap lock seam takes place with locking by solely resilient bending-up of the snap lock seam.

In particular, the catch standing seam can be provided in the component made of a brittler material, such as the magnet component. This seam can be preferably completely fully formed with the formation of the magnet component.

Alternatively or additionally to pure flange, i.e. flange without additional components, a flange part may be provided which fixes against each other those flanged regions of the magnet component and rotation component which are associated with each other. The structural unit with magnet component, rotation component and flange part may thus consist of three components connected securely together by means of flange.

Preferably the flange part is adapted to the geometries of the magnet component and rotation component. It may also be constructed from a plurality of segments or partial pieces which hold the magnet component and rotation component together by crimping. It may also have a base body from which a projection or a plurality of flag-like projections start(s) preferably in flag-like manner, which crimp the magnet component and rotation component for flange. Preferably the projections are peripherally equally spaced apart and preferably arranged, starting from a peripheral circle, starting from the base body. There may be provided, preferably in an alternating sequence, first projections extending away from the base body in a preferably axial direction to the axis of rotation, and second projections extending in the opposite direction thereto. In mechanically advantageous manner, the flange part may have a form which is rotationally symmetrical to the axis of rotation provided. The flange part may for example have a circular-segment-like projection or a plurality of, in particular three or four, circular-segment-like projections.

The flange part may generally be formed adapted to the geometry of the magnetic rotation component. The flange part may for example be formed in a ring shape. This ring shape may be formed in partially peripheral or completely peripheral manner.

In particular, the flange part may be formed as a flange ring or flange ring segment which clamps together the flanged regions of the magnet component and rotation component by engaging over them.

The flange ring or the flange ring segment may have a round, such as circular or ellipsoidal, outline or an angled, such as polygonal, in particular quadrilateral or hexagonal, outline.

In one advantageous embodiment of the magnetic rotation component, the flanged regions may be arranged radially externally and/or radially internally in particular to the magnet component with respect to the rotary shaft.

In particular, the magnet component and/or the rotation component may be formed rotationally symmetrically and/or circularly symmetrically with respect to the rotary shaft. In this case, this symmetry may have slight deviations from a pure, that is to say geometrically exact, rotational symmetry or circular symmetry.

Secure connection of the two components can be achieved solely by means of the connection by flange described above. Nevertheless, an in particular purely mechanically effective anti-twist device for securing against relative twisting of the magnet component and rotation component about the rotary shaft can be provided for further securing of the relative position of the two components relative to each other. In particular, provision is made for the two components to be connected lying against one another in displacement-resistant manner with respect to a plane perpendicular to the rotary shaft by means of the anti-twist device.

Advantageously, an insertion connection may be provided as the anti-twist device, via which the two components engage in one another preferably axially.

In particular, the anti-twist device may have on one component, that is to say on the magnet component and/or the rotation component, a projection, in particular a pin, which, forming the insertion connection, engages preferably axially in an associated cutout provided on the other component, that is to say on the rotation component or the magnet component. Also a plurality of projections, in particular pins, may be provided equally spaced-apart in particular on a peripheral circle relative to the axis of rotation and in particular peripherally, which projections in order to form the insertion connection engage in each case preferably axially in an associated cutout provided on the other component, that is to say on the rotation component or the magnet component. In this case, the insertion connection may at the same time serve as a centering aid for centering the components.

In a structurally simple configuration of the magnetic rotation component, the two components in the connection position may lie against each other directly axially and in particular flat via the anti-twist device. In particular, the two components in the connection position may lie against each other on their end faces. In a structurally simple manner, the cutouts may be formed in each case as through-cutouts.

Centering of the components with respect to the axis of rotation can take place already by means of the interlocking insertion connection when assembling them. Further, centering can take place by means of the interlocking of the flanged regions upon flange.

Preferably provision is made, in particular for pre-centering, for the two components to be pulled onto a centering core for assembly. In this case, the longitudinal axis of said core is identical to the axis of rotation.

In particular, the magnet component and rotation component in the connection position may be arranged under axial elastic initial tension.

The magnet component and rotation component in the connection position may be arranged axially spaced apart by means of a gap. In one possible design, the cutouts may in each case be formed as blind cutouts. In particular, the pins in the connection position may be arranged lying against the base in the blind cutout which is associated in each case.

To form the gap with the two components lying against one another, the axial height of the pins may be designed to be greater than the axial depth of the cutout which is associated in each case. Thus the two components with production of the flanged connection are braced axially resiliently to each other while approaching in the gap. In this case, slight resilient bracing is preferred. This may be up to five newtons (N), in particular up to 2.5 N or up to 1.1 N.

In an economically and structurally advantageous embodiment of the magnetic rotation component, the magnet component may be formed in one piece. In particular, the magnet component may be formed preferably completely from plastics-bound, in particular powdered, permanent magnet particles. To this end, the permanent magnet particles may be arranged in known form embedded in a plastics matrix.

Advantageously in simple manner, the magnet component or at least parts thereof may be produced as an injection-molded part, pressed part or sintered component.

In order to avoid harmful deformation of the magnet component upon the flange, provision may be made for, for example, also the insertion connection described above and the flanged regions described above to be formed with all the necessary geometries, in particular with hooks, solely by means of injection-molding, pressing or sintering. Thus the magnet component upon the flange can be crimped by the rotation component, without in so doing being plastically deformed at all.

Likewise, the rotation part may be formed in one piece. Thus the magnetic rotation component in its simplest embodiment may be manufactured merely from two components, the magnet component and the rotation component. With the additional flange part for flange described above, there are at most three components.

In a particularly preferred embodiment of the magnetic rotation component, it may be formed as an impeller for a liquid pump, such as a water pump or auxiliary coolant pump. To this end, the rotation component may be formed as a blade part with an axis of rotation, preferably with a hollow shaft or sleeve.

The magnet component may preferably be formed as a ring-like magnet, preferably as a ring magnet or ring-segment magnet. Advantageously, the magnet component may have a rotationally symmetrical form. In particular the magnet component may be formed as a hollow-cylinder magnet. The magnet component may serve as a stator or rotor for driving the magnetic rotation component for example by an electrical rotary field.

For the liquid to flow undisturbed through the hollow shaft, the internal diameter of the magnet component may be larger than, in particular more than twice as large as, the internal diameter of the hollow shaft.

Preferably the hollow-cylinder magnet and blade part with axis of rotation are arranged axially substantially one behind the other. In this case, they may overlap axially in the region of the flange and/or of the anti-twist device.

In a further special embodiment of the magnetic rotation component, it may be formed as a torque magnet component for detecting a torque acting on the axis of rotation. The rotary part may be formed as a bearing sleeve which can be mounted preferably freely rotatably on the axis of rotation. The magnet component may be formed as a ring magnet.

The rotary part and magnet component in the case of the torque magnet component may be arranged coaxially with the rotary part radially internally to the magnet component. Alternatively, the rotary part and magnet component may be arranged axially one behind the other. To this end, the magnetic rotation component may have as magnet component a disc-like magnet which adjoins the rotary part coaxially and axially, preferably spaced apart by means of a gap.

Alternatively, the rotary part and/or the magnet component in the case of a coaxial arrangement may be arranged protruding beyond the respective other part axially in each case in a different direction. The rotary part may have flanged regions with which the rotary part engages over the flanged regions of the magnet component by crimping. Alternatively, a preferably hollow-cylindrical flange part may be provided which, arranged coaxially externally to the rotary part and to the magnet component, in clamp-like manner engages over the rotary part with one axial end and the magnet component with the other axial end by crimping.

In particular, preferably means which are effective purely mechanically may be provided for non-transposable assembly of the magnetic rotation component for example on a rotary shaft or axis of rotation in accordance with the poka-yoke system as an error-avoiding principle.

IV. BRIEF DESCRIPTION OF THE DRAWINGS

Figure 3:
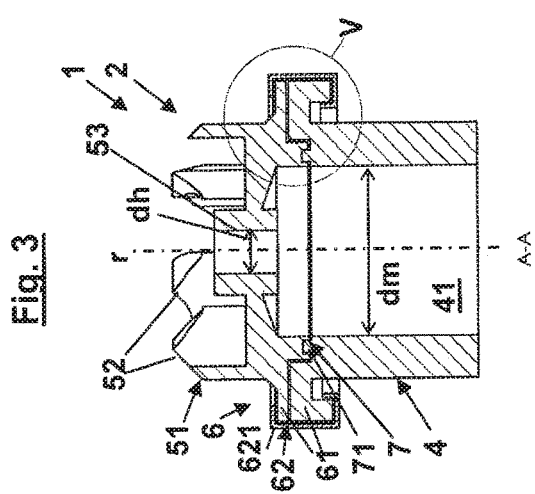
Figure 4:
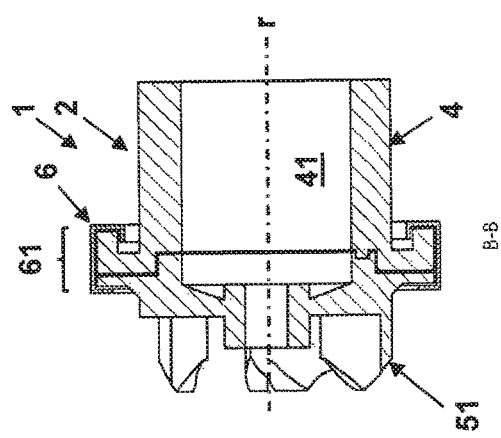
Figure 1:
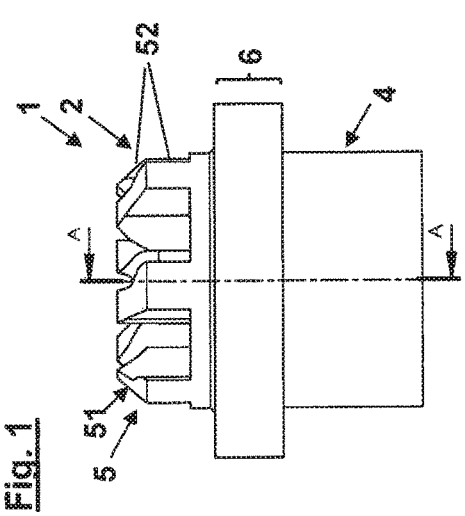
Figure 2:
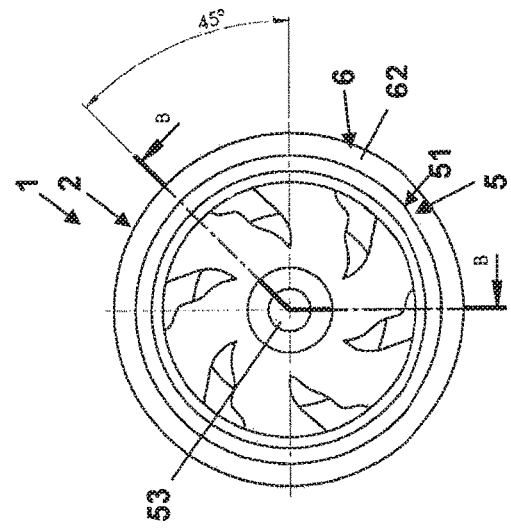
Figure 22:
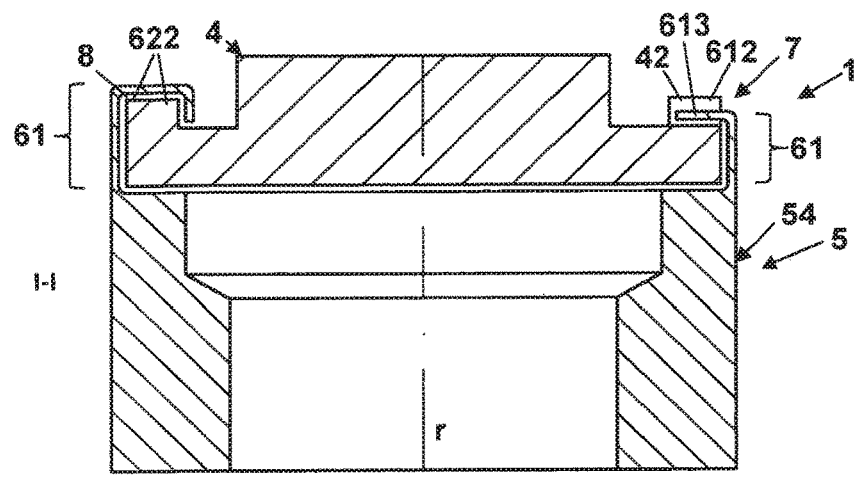
Figure 21:
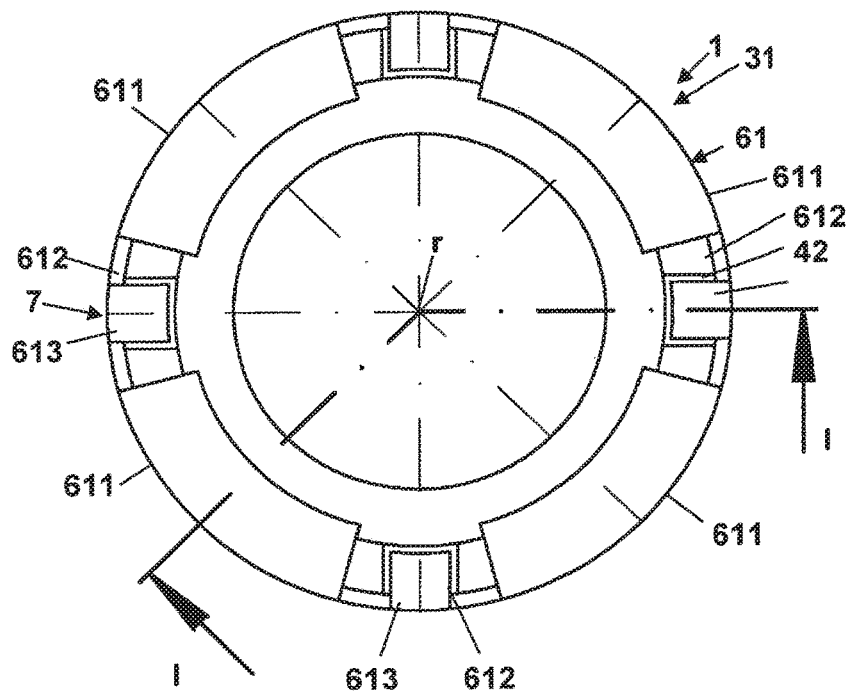
Figure 23:
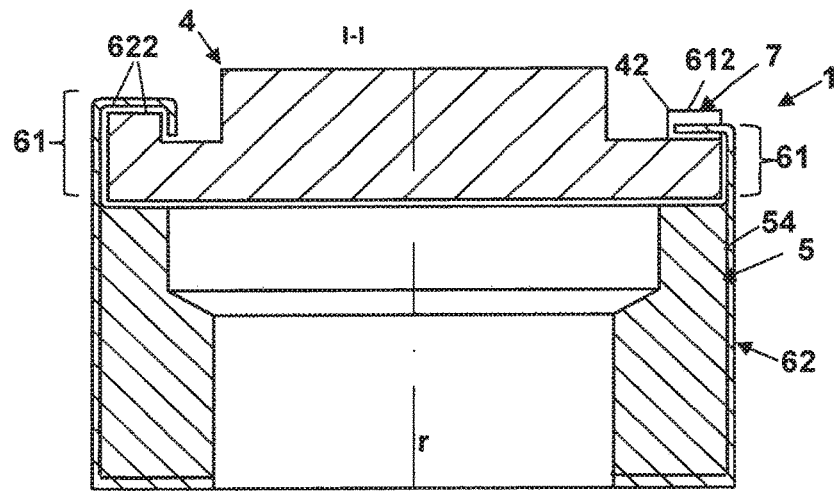
Figure 24:
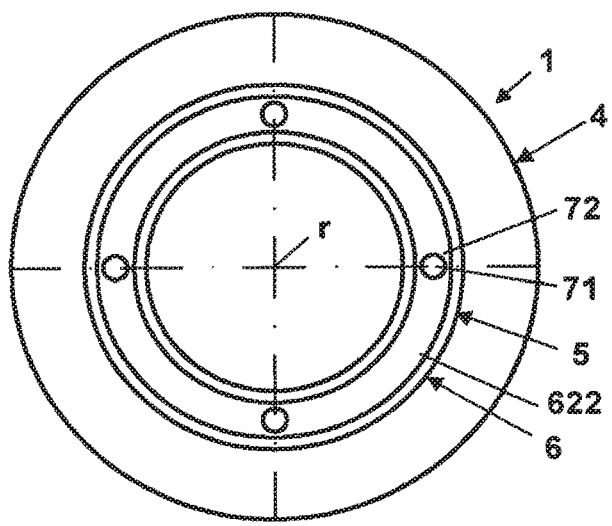
Figure 26:
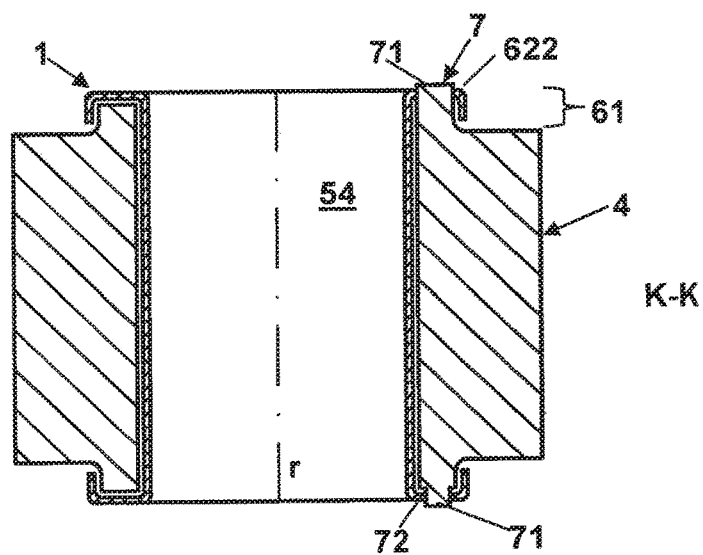
Figure 25:
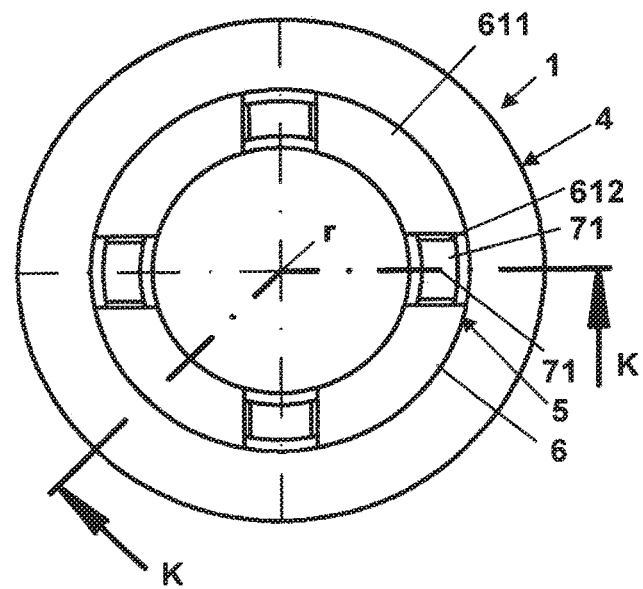
Figure 29:
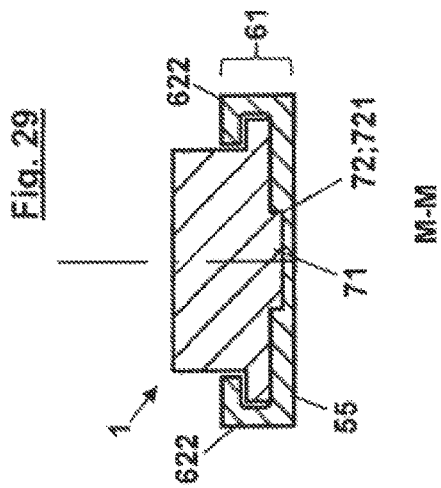
Figure 28:
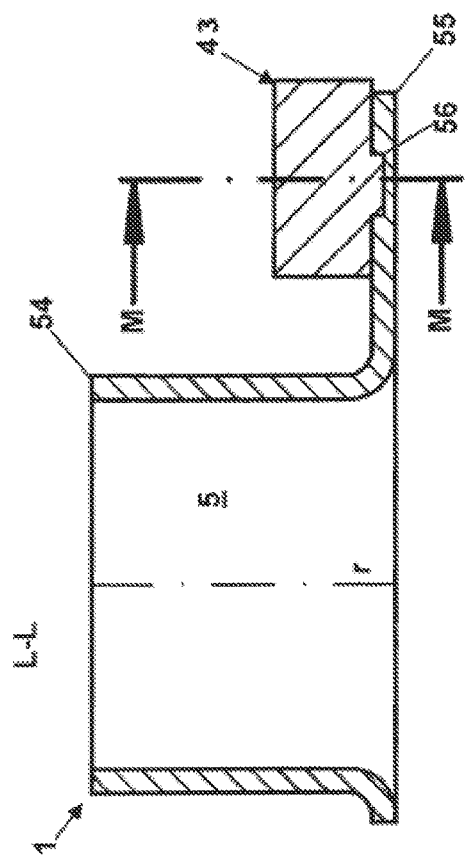
Figure 27:
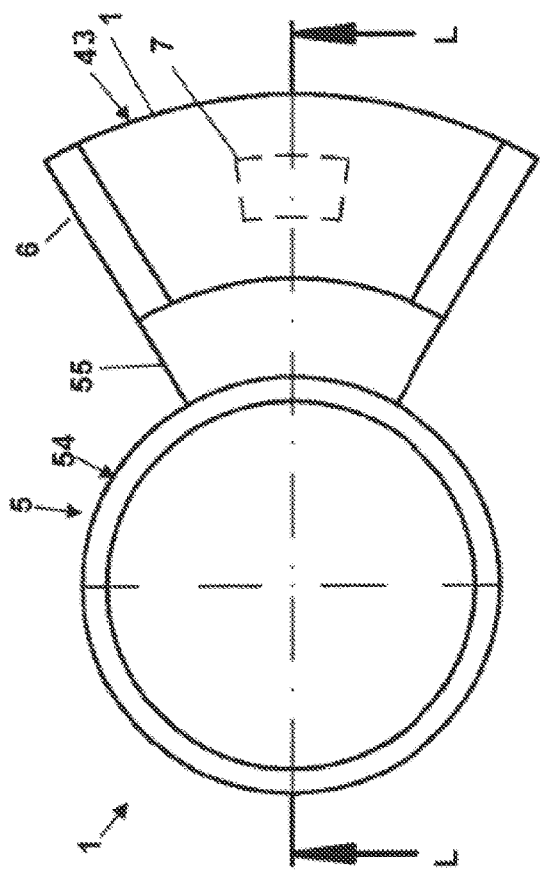

The present invention will be explained in greater detail below with reference to a plurality of embodiments of the guidance which are illustrated in drawings, without however restricting the invention to these. In the drawings:

FIG. 1 is a side view of a first embodiment of a magnetic rotation component formed as an impeller, FIG. 2 is a top view of the magnetic rotation component of FIG. 1, FIG. 3 is a sectional view of the magnetic rotation component along the section line A-A of FIG. 1, FIG. 4 is a sectional view of the magnetic rotation component along the section line B-B of FIG. 2, FIG. 5 is a detail view of the magnetic rotation component in accordance with detail V in FIG. 3, FIG. 6 is a top view of a second embodiment of the magnetic rotation component which is formed as a blade part, FIG. 7 is a side view of the magnetic rotation component of FIG. 6, FIG. 8 is a sectional view of the magnetic rotation component along the section line C-C of FIG. 6, FIG. 9 is a sectional view of the magnetic rotation component along the section line D-D of FIG. 7, FIG. 10 is a detail view of the magnetic rotation component in accordance with detail X in FIG. 9, FIG. 11 is a side view of a first embodiment of the magnetic rotation component, which is formed as a torque magnet component, FIG. 12 is a top view of the magnetic rotation component of FIG. 11, FIG. 13 is a sectional view of the magnetic rotation component along the section line e-e of FIG. 11, FIG. 14 is a sectional view of the magnetic rotation component along the section line f-f of FIG. 12, FIG. 15 is a detail view of the magnetic rotation component in accordance with detail XV in FIG. 14, FIG. 16 is a side view of a second embodiment of the magnetic rotation component which is formed as a torque magnet component, FIG. 17 is a top view of the magnetic rotation component of FIG. 16, FIG. 18 is a sectional view of the magnetic rotation component along the section line g-g of FIG. 16, FIG. 19 is a sectional view of the magnetic rotation component along the section line h-h of FIG. 17, FIG. 20 is a detail view of the magnetic rotation component in accordance with detail X in FIG. 19, FIG. 21 is a side view of a further embodiment of the magnetic rotation component, FIG. 22 is a sectional view along the section line I-I in FIG. 22, FIG. 23 is a sectional view along the section line I-I in FIG. 22, but additionally with a flange part, FIGS. 24 and 25 are in each case a side view of a further embodiment of the magnetic rotation component which is formed as a torque magnet component, FIG. 26 is a sectional view along the section line K-K in FIG. 22, FIG. 27 is a side view of a further embodiment of the magnetic rotation component as a segment magnet, FIG. 28 is a sectional view along the section line L-L in FIG. 27, and FIG. 29 is a sectional view along the section line M-M in FIG. 28.

In the description, all the concepts for describing location such as above, below, front, rear, right and left are intended as shown in the respective figure itself, unless specifically defined otherwise.

V. DETAILED DESCRIPTION OF THE DRAWINGS

In FIGS. 1 to 5 or 6 to 10, a first or a second embodiment of a magnetic rotation component 1 respectively is shown in various views, the magnetic rotation component 1 being formed here as an impeller 2. Similarly, in the groups of FIGS. 11-15, 16-20, 21-22, 23, 24-26 and 27-29 in each case a further embodiment of the magnetic rotation component 1 formed here as a torque magnet component 3 is shown in various views.

In all the embodiments, the magnetic rotation component 1 comprises a magnet component 4 and a rotation component 5 with axis of rotation r, the magnet component 4 and the rotation component 5 being connected securely together by means of a flange (or flanging) 6.

As can be inferred from the figures, the magnetic rotation component 1 is formed symmetrically in all its embodiments. In this case, the rotation component 5 according to FIGS. 1 to 10 is constructed axially symmetrically with respect to the axis of rotation r, and the rotation component 5 according to FIGS. 11 to 20 is constructed substantially rotationally symmetrically with respect to the axis of rotation r. Likewise, the magnet component 4 of both components 4, 5 is likewise formed substantially rotationally symmetrically. "Substantially" here means in each case that the basic form of the magnetic rotation component 1 is constructed correspondingly rotationally symmetrically, but may have deviations in symmetry with regard for example to the blades 52 introduced further below and/or the pins 71.

As can be inferred from the figures, the magnet component 4 and the rotation component 5 in each case have at least one ring-shaped or ring segment-shaped flanged region 61, with the flanged regions 61 of the two components 4, 5 overlapping.

According to the embodiments in FIGS. 11 to 20, the magnet component 4 and the rotation component 5 are directly connected together by the flange 6. To this end, the flanged regions 61 of the magnet component 4 and the rotation component 5 engage in each other in hook-like manner.

According to FIGS. 1 to 10, additionally a flange part 62 is provided for connecting the magnet component 4 to the rotation component 5. Without wishing to restrict the invention to this, in the embodiments shown here the flange part 62 in adaptation to the geometry of the magnetic rotation component 1, which here is substantially cylindrical, is formed as a flange ring 621.

As can be inferred in particular from FIGS. 3, 4, 8 and 9, the flange ring 621 engages over the two flanged regions 61 of the magnet component 4 and rotation component 5. The flange ring 621 encompasses the flanged regions 61 of the magnet component 4 and the rotation component 5 axially over the entire periphery. In this case, the flange ring 621 lies axially from above flat on the rotation component 5, while it engages in hook-like manner in the flanged region 61 of the magnet component 4, which here is likewise formed in hook-like manner.

For hook-like interlocking, the flanged regions 61 or the flange ring 621 have in each case a ring-shaped hook profile 622 which is bent twice in profile. The hook profile 622 is thus provided with a U-shaped, and here right-angled, hook profile 622 which points with its free end 623 in the direction of the axis of rotation r. In both cases, by means of the hook-like interlocking of the flanged regions 61 or of the flange ring 621 into the flanged region 61 of the magnet component 4, a connection which is resistant to displacement with respect to a plane perpendicular to the axis of rotation r is produced. Resistance to twisting is provided in this case by frictional contact of the flanged regions 61 and/or of the flange ring 621 against each other.

The flanged regions 61 of the magnet component 4 and rotation component 5 in the embodiments according to FIGS. 6 to 10 are arranged radially internally relative to the magnet component 4 and hence in protected manner in an interior 41 which is defined by the magnet component 4. By contrast, in the other embodiments according to FIGS. 1 to 5 and 11 to 20, in each case they are arranged radially externally and hence more easily accessible for assembly with flange 6.

In particular, an anti-twist device 7 which here is effective purely mechanically is provided for securing against relative twisting of the magnet component 4 and rotation component 5 about the axis of rotation r.

The anti-twist device 7 to this end comprises on one of the two components 4, 5 a plurality of axial pins 71 which lie on a circumcircle and are peripherally equally spaced-apart relative to the axis of rotation r, which pins with respect to the axis of rotation r engage axially in each case in an associated cutout 72 provided on the other component 5, 4, forming an insertion connection. In this case, the pins 71 in the embodiment of the magnetic rotation component 1 according to FIGS. 11 to 15 are in each case arranged on the magnet component 4, and the axial cutouts 72 associated with this pin 71 are arranged correspondingly on the rotation component 5. In the embodiments of the magnetic rotation component 1 according to the other FIGS. 1 to 10 or 16 to 20, the arrangement of pins 71 and cutouts 72 is reversed, in that the pins 71 are arranged on the rotation component 5 and the cutouts 72 on the magnet component 4.

The number of pins 71 and of the correspondingly associated cutouts 72 differs in the embodiments of the magnetic rotation component 1 illustrated here in the respect that in the embodiments of the magnetic rotation component 1 formed as impellers 2, six pins 71 spaced apart peripherally by 60°, and in the embodiment of the magnetic rotation component 1 formed as a torque magnet component 3, three pins 71 spaced apart peripherally by 120°, are provided.

In the embodiments of the magnetic rotation component 1 according to FIGS. 6 to 20, the magnet component 4 and rotation component 5 in the connection position lie axially flat against each other. A configuration of the magnetic rotation component which deviates from this is illustrated by means of the detail representation V, which here relates to the first embodiment of the magnetic rotation component 1 formed as an impeller 2: here, an axial height h of the pins 71 is greater than an axial depth t of the cutouts 72, these in each case being formed as blind cutouts 721. As a result, the pins 71 in the connection position extend in each case at the base in the associated blind cutout cutouts 721, forming an annular gap 8 lying in the plane perpendicular to the axis of rotation r with a low gap height s between the magnet component 4 and rotation component 5. The gap height h here is in the region of tenths of a millimeter.

The over-flange of the flanged regions 71 of the magnet component 4 and rotation component 5 with the flange ring 621 can be set such that the magnet component 4 and rotation component 5 approach each other slightly in the region of the annular gap 8 and thus deform resiliently to the desired slight extent, the material components of these components 4, 5 at least in the flanged regions 61 thereof being selected such that exclusively the rotation component 5 is resiliently braced. Due to this resilient bracing, increased strength and a reduction in the risk of the flange 6 loosening can be achieved.

In the magnetic rotation component formed as an impeller 2, the rotation component 5 is formed as a blade part 51 with blades 52 extending away axially and with a hollow shaft 53 or sleeve, which in the mounting position is mounted freely rotatably on the axis of rotation r of a structural environment, not shown further here.

In the case of the magnetic rotation component 1 which is formed as a torque magnet component 3, the rotation component 5 is formed as a bearing sleeve 54 with a hollow shaft 53, over which the torque magnet component 3 can be pushed axially onto a shaft, not shown here, for torque pick-up.

In the case of the impeller 2 and in the case of the torque magnet component 3, the magnet component 4 has in each case a substantially hollow-cylindrical form, the internal diameter dm of the hollow-cylindrical form being greater than the minimum internal diameter of the rotation component 5, i.e. greater than the internal diameter dh of the hollow shaft 53.

The bearing sleeve 54 and magnet component 4 in the case of the torque magnet component 3 in the embodiment according to FIGS. 11 to 15 are arranged one behind the other except for the overlapping flanged regions 61. According to FIG. 16-20 or 24-26, the bearing sleeve 54 and magnet component 4 are arranged coaxially with the bearing sleeve 54 radially internally to the magnet component 4, the magnet component 4 in FIGS. 16-20 lying radially externally directly on the bearing sleeve 54, stabilizing the torque magnet component 3.

In FIGS. 21-23, the magnetic rotation component 1 is formed as a pot magnet 31. The bearing sleeve 54 here is arranged coaxially and spaced apart from the magnet component 4 by means of the gap 8. The magnet component 4 has a disc-like ring-shaped permanent magnet with a radially outer flanged region 61 with a hook profile 622. Likewise, the bearing sleeve 54 has a hook profile 622 extending here in the axial direction, the magnet component 4 and the bearing sleeve 54 interlocking via the hook profiles 622. In one configuration of the flanged region 61, the bearing sleeve 54 engages with an axial portion over the magnet component 4 here radially externally. Then the flanged region 61 of the bearing sleeve 54 is folded radially inwards in hook-like manner. Further, the flanged region 61 is divided into four peripherally equally spaced-apart segments of a circle 611 which crimp the flanged region 61 of the magnet component 4 in hook-like manner. Peripherally between the segments of a circle 611 there are provided breaks 612 in which the anti-twist device 7 is arranged. To this end, the magnet component 4 has for each break 612 a radial notch 42 through which the bearing sleeve extends in hook-like manner with a tab pointing radially inwards such that it is arranged with a certain play in twisting-resistant manner in the break 612 which is associated in each case.

An alternative embodiment to this is shown in FIG. 23 in conjunction with FIG. 21, in that here the flange part 62 is additionally provided to form the flange 6. This part engages in clamp-like manner over both components, the magnet component 4 and the bearing sleeve 54, axially and radially externally. The magnet component 4 and bearing sleeve 54 lie against each other axially spaced apart by means of a gap 8. The flanged region 61 of the flange part 62, with which the flange part 62 engages over the magnet component 4, is formed identically to the flanged region 61 of the bearing sleeve 54 of the configuration of the magnetic rotation component 1 according to FIG. 22. With the flanged region 61 at the other end of the flange part 62, the same engages over the rotation component 5, i.e. the bearing sleeve 54, radially inwards. Both embodiments of the magnetic rotation component 1 according to FIGS. 21 to 23 are designed in order to select a particular angle of rotation with respect to the axis of rotation r for example in the case of throttle valves.

In the embodiment of the magnetic rotation component 1 according to FIGS. 24 to 25, the rotation component 5 is formed as a bearing sleeve 54 which has flanged regions 61 at both ends, and the magnet component 4 is formed as a substantially hollow-cylindrical permanent magnet, likewise with flanged regions 61 at both ends. The magnet component 4 is arranged coaxially and radially externally to the bearing sleeve 54. In structurally simple and assembly-friendly manner, the flanged regions 61 are formed substantially mirror-symmetrically to each other with respect to a middle plane of cross-section as plane of symmetry.

As can be seen in the two FIGS. 24 and 25, each of which shows an end view of the magnetic rotation component 1, the magnet component 4 engages at the bottom and top in the bearing sleeve 54 in each case via pins 71, forming the anti-twist device 7. To this end, the pins 71 are formed at the bottom as round pins which in each case engage in a positive lock in an associated corresponding circular cutout 72 provided on the bearing sleeve 54. Similarly to the embodiment of the magnetic rotation component 1 according to FIGS. 21 and 22 described above, the bearing sleeve 54 in its flanged region 61 engages by means of provided tabs 613 over the rotation component 5 here in a direction extending radially outwards, namely in each case through an notch 42 provided in the magnet component 4.

For assembly, the magnet component 4 can thus be pushed axially over the bearing sleeve 54 until it engages, striking with the end face, with its pin 71 in the circular cutouts 72 of the bearing sleeve 54. In order to obtain a positionally stable seat of the magnet component 4 on the bearing sleeve 54, it is then only still necessary to bend the tabs 613 in hook-like manner such that the tabs 613 extend through the associated break 612 in each case and then, forming a positive lock, bent over radially externally in the axial direction, point to the other end of the bearing sleeve 54.

The embodiment of the magnetic rotation component 1 according to FIGS. 27 to 28 differs in particular in that the magnet component 4 has a circular-segment-like form with a segment magnet 43. This is arranged coaxially to the bearing sleeve 54. The segment magnet 43 may for example be arranged lying directly radially internally against the bearing sleeve 54. In order however to obtain a greater distance from the axis of rotation r which is beneficial in measurement terms, in the embodiment of the magnetic rotation component 1 shown here a spacer part 55 here connected in one piece to the bearing sleeve 54 is provided which extends radially outwards and here just as with the segment magnet 43 has a circular-segment-like form. The spacer 55 has a receptacle 56 which is defined in the peripheral direction on either side by the flanged region 61. For assembly, merely the segment magnet 43 has to be placed in the receptacle 56 and be crimped with the flanged regions 61. On the base of the receptacle 56, as can be inferred from the longitudinal sectional view according to FIGS. 28 and 29, there is provided the anti-twist device 7. To this end, the segment magnet 43 has on its underside a pin 71, here with a circular-segment-like cross-section, which in the mounting position engages in a positive lock in a cutout 72 set into the receptacle 56. The cutout 72 is formed adapted to the pin 71. The cutout 72 is formed as a blind cutout.

Both embodiments of the magnetic rotation component according to FIGS. 24 to 26 or 27 to 29 respectively are designed in order to select for example specific torques with respect to the axis of rotation r.

Magnetic Rotation Component

LIST OF REFERENCE CHARACTERS

1 magnetic rotation component
2 impeller
3 torque magnet component
31 pot magnet
4 magnet component
41 interior
42 notch
43 segment magnet
5 rotation component
51 blade part
52 blade
53 hollow shaft
54 bearing sleeve
55 spacer
56 receptacle
6 flange
61 flanged region
611 611 segment of a circle
612 612 break
613 613 tab
62 flange part
621 621 flange ring
622 622 hook profile
623 623 end
7 anti-twist device
71 pin
72 cutout
721 721 blind cutout
8 annular gap
dm internal diameter
dh internal diameter
h height
r axis of rotation
s gap height
t depth

The invention claimed is:

1. A magnetic rotation component (1) comprising:
a magnet component (4) with a permanent magnet;
a rotation component (5) with an axis of rotation (r); and
a flange (6), and
wherein the magnet component (4) and the rotation component (5) are arranged and connected securely in a displacement-resistant and twisting-resistant manner together by the flange (6), the magnet component (4) and the rotation component (5) each comprising a ring-shaped or ring-segment-shaped flanged region (61), the flanged region (61) of the magnet component (4) or the flanged region (61) of the rotation component (5) being formed in a hooked manner and the flanged region (61) of the magnet component (4) overlapping the flanged region (61) of the rotation component (5);
wherein
the flanged region (61) of the magnet component (4) and the flanged region (61) of the rotation component (5) are bent twice in the hooked manner to form bent members which are directly connected with crimping said bent members in a hooked manner together, or
the flanged region (61) of the magnet component (4) or the flanged region (61) of the rotation component (5) is bent twice in the hooked manner and attached to a flanging region of a separate flange part (62) which flanging region is bent twice in a hooked manner, wherein the separate flange part clamps together the flanged regions of the magnet component (4) and the rotation component (5) by engaging over them.

2. The magnetic rotation component (1) according to claim 1, wherein the flanged region (61) is arranged interlockingly in the hooked manner for connection by the flange (6).

3. The magnetic rotation component (1) according to claim 1, wherein the flange part (62) is formed in a ring or a ring-segment manner.

4. The magnetic rotation component (1) according to claim 3, wherein the flange part (62) is formed as a flange ring (621) or a flange ring segment which clamps together the flanged regions (61) by engaging over them.

5. The magnetic rotation component (1) according to claim 1, wherein the flanged region (61) is arranged radially externally and/or radially internally to the magnet component (4) with respect to the axis of rotation (r).

6. The magnetic rotation component (1) according to claim 1, wherein the magnet component (4) and/or the rotation component (5) are formed rotationally symmetrically and/or circularly symmetrically with respect to the axis of rotation (r).

7. The magnetic rotation component (1) according to claim 1, further comprising an anti-twist device (7) for securing against relative twisting of the magnet component (4) and rotation component (5) about the axis of rotation (r).

8. The magnetic rotation component (1) according to claim 7, wherein the anti-twist device (7) includes on either the magnet component (4) or the rotation component (5) a plurality of pins (71) arranged on a peripheral circle relative to the axis of rotation (r) and peripherally equally spaced apart, which in each case engage axially in an associated cutout (72) provided on the other component (5, 4).

9. The magnetic rotation component (1) according to claim 8, wherein the cutouts are formed in each case as blind cutouts (721), the pins (71), in a connection position in which the magnet component (4) is arranged connected to the rotation component (5) by the flange (6), being arranged lying on a base in the blind cutouts (721).

10. The magnetic rotation component (1) according to claim 7, wherein the anti-twist device (7) includes on either the magnet component (4) or the rotation component (5), a plurality of pins (71) arranged on a peripheral circle relative to the axis of rotation (r).

11. The magnetic rotation component (1) according to claim 10, wherein as either the magnet component (4) or the rotation component (5) includes blind cutouts (721), the pins (71), in a connection position in which the magnet component (4) is arranged connected to the rotation component (5) by the flange (6), being arranged lying on a base in the blind cutouts (721).

12. The magnetic rotation component (1) according to claim 11, wherein an axial height (h) of the pins (71) is greater than an axial depth (t) of a respectively associated cutout (72).

13. The magnetic rotation component (1) according to claim 1, wherein the magnet component (4) and the rotation component (5) in the connection position are arranged axially spaced apart by a gap (8) and under axial initial tension.

14. The magnetic rotation component (1) according to claim 1, wherein the magnet component (4) and/or the rotation component (5) are in each case formed in one piece.

15. The magnetic rotation component (1) according to claim 1, wherein the magnet component (4) is formed as an injection-molded part, a pressed part or a sintered part in each case from plastics-bound permanent magnet particles.

16. The magnetic rotation component (1) according to claim 1, wherein the magnetic rotation component is an impeller (2) for a liquid pump, the rotation component (5) includes a blade part (51) with a hollow shaft (53) for mounting on an axle or shaft.

17. The magnetic rotation component (1) according to claim 1, wherein the magnetic rotation component is a torque magnet component (3) with the rotation component (5) including a bearing sleeve (54) for mounting on an axle or shaft and the magnet component (4) including a ring magnet.

18. The magnetic rotation component (1) according to claim 1, wherein the magnetic rotation component is a pot magnet (31) with the rotation component (5) including a bearing sleeve (54) for mounting on an axle or shaft and the magnet component (4) including a disc magnet.

19. The magnetic rotation component (1) according to claim 1, wherein the magnet component (4) and rotation component (5) in the connection position are arranged axially spaced apart by a gap (8).

* * * * *